(No Model.)

A. JOHNSON.
BOLT NUT.

No. 300,475.                    Patented June 17, 1884.

WITNESSES:
J. D. Garfield
Henry A. Chapin

INVENTOR
Alonzo Johnson
BY Henry A. Chapin
ATTORNEY

N. PETERS, Photo-Lithographer, Washington, D. C.

UNITED STATES PATENT OFFICE.

ALONZO JOHNSON, OF SPRINGFIELD, MASSACHUSETTS, ASSIGNOR TO GEORGE DWIGHT, JR., OF SAME PLACE.

BOLT-NUT.

SPECIFICATION forming part of Letters Patent No. 300,475, dated June 17, 1884.

Application filed January 30, 1884. (No model.)

*To all whom it may concern:*

Be it known that I, ALONZO JOHNSON, a citizen of the United States, residing at Springfield, in the county of Hampden and State of Massachusetts, have invented new and useful Improvements in Bolt-Nuts, of which the following is a specification.

This invention relates to improvements in bolt-nuts, the object being to provide a nut of improved form and construction, whereby a nut is made which is adapted for all of the ordinary uses of a common nut, and which is, if desired, a self-locking one; and, furthermore, to provide a nut which embodies in its construction less iron or other metal than does an ordinary one, without reducing its power to resist the strain put upon it when screwed onto a bolt; and, also, to provide such an improved nut in respect to the metal it contains and the cost of making it and the greater number which can be produced of a given size from a ton of iron as results in a great economy of manufacture.

Figure 1:
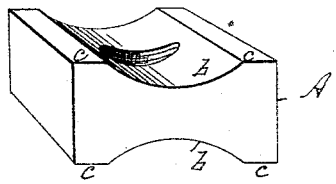
Figure 2:
Figure 3:
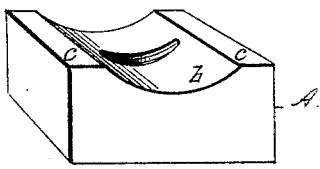
Figure 4:
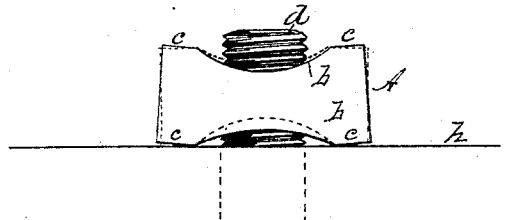
Figure 5:
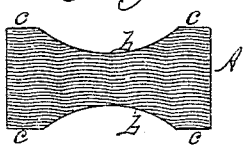

In the drawings forming part of this specification, Figure 1 illustrates a nut constructed according to my invention. Fig. 2 is a longitudinal section through the thinnest part of the nut. Fig. 3 illustrates a modification of the nut shown in Fig. 1. Fig. 4 illustrates the form which the nut takes when screwed onto a bolt with force against an object. Fig. 5 is a section of one end of the nut.

In the drawings, A is the nut, which is of the usual rectangular form; but one or both of its faces is provided with an arched or concave central portion, $b$, leaving two continuous bearing-surfaces, $c\ c$, on each side. The arched portion of the face of the nut is between the straight bearing-faces $c\ c$ on each side of the arch, which faces $c\ c$ are in the same plane, so that when the nut is screwed against an object each of the faces $c$ provides a bearing under the entire side of the nut on which it is, and any deflection of the surface of the nut occasioned by screwing it down is on a center line parallel with the faces $c\ c$, through the crown of the arch and the center of the bolt-hole.

The effect of screwing the nut A forcibly against an object is illustrated in Fig. 4, in which $d$ is the bolt, and the line $h$ represents the face of said object. The dotted lines in Fig. 4 represent, substantially, the positions from which parts of the nut have been forced by the strain brought upon that portion of it between the faces $c\ c$. The upper opposite sides, over which are the letters $c\ c$, are drawn toward the bolt, and consequently the upper part of the nut adjoining said opposite sides is so forced against the bolt $d$ that the nut thereby becomes tightly locked on the latter, and will not shake loose, even though the face $h$, against which it bears, should become worn away.

This nut may be employed under all circumstances where a plain-faced ordinary nut is used, or by forcing it sufficiently it becomes an efficient lock-nut.

The manufacture of this nut does not require that any portion of the iron be sawed out of it to convert a solid nut into a lock-nut, as is the case with many of the latter class heretofore made, in sawing some of which the waste is very considerable.

The nut herein described and shown is formed by pressing it into the shape shown, whereby no such waste as is above referred to can occur, and the nut is as much lighter than a plain-faced nut of the same size as is the weight of iron required to fill the concave spaces on its sides. Therefore more nuts are made from a ton of iron when their sides are arched as shown. For ordinary purposes, or when the nuts are not to be subjected to uncommon strain, they are made irrespective of the direction in which the rolled grain of the iron runs in the nut.

Ordinarily nuts are cut off from a flat rolled iron bar, and in pressing such pieces to impress the arched portions $b$ into them the curve of the arch is formed in the direction in which the grain of the iron runs when nuts of the greatest strength are required, as shown in Fig. 5, in which figure the wavy sectional lines represent to a certain extent the appearance of the iron in a rolled bar when broken longitudinally.

Fig. 3 illustrates a nut having only one side made like the opposite sides of that shown in Fig. 1. This form may be adopted for some kinds of work; but the action of the nut is much better when doubly arched. When these nuts are made with the curved portion thereof running in the direction of the grain of the iron, as above described, although they are thinner between the crown of the arches than a plain nut, I have discovered that they have as great power of resistance as the latter.

What I claim as my invention is—

1. A nut having two parallel straight edge bearing-surfaces on the same side and recessed between the bearings, substantially as set forth.

2. A nut having two parallel straight edge bearing-surfaces on the same side or face, between which surfaces is an arch-shaped concavity, the curve of which is in the direction in which the rolled grain of the iron runs of which the nut is made, substantially as set forth.

3. A nut having two opposite straight bearing-surfaces on both its sides, between which surfaces is an arch-shaped concavity extending from edge to edge of the nut, substantially as set forth.

ALONZO JOHNSON.

Witnesses:
H. A. CHAPIN,
WM. H. CHAPIN.